(12) United States Patent
Li

(10) Patent No.: US 6,435,578 B1
(45) Date of Patent: Aug. 20, 2002

(54) ENERGY DISSIPATING DEVICE FOR AN AUTOMOBILE BUMPER

(76) Inventor: Zhao Wen Li, No. 6, Cangmohe Hutong, Nanmen, Dongcheng District, Beijing (CN)

( * ) Notice: Subject to any disclaimer, the term of this patent is extended or adjusted under 35 U.S.C. 154(b) by 0 days.

(21) Appl. No.: 09/526,724

(22) Filed: Mar. 16, 2000

(30) Foreign Application Priority Data

Jan. 27, 2000 (CN) .......................... 00 2 01379

(51) Int. Cl.⁷ .......................... B60R 19/32; B60R 19/26
(52) U.S. Cl. .......................... 293/134; 293/107; 293/132
(58) Field of Search ................. 293/107, 132, 293/134, 110

(56) References Cited

U.S. PATENT DOCUMENTS 2,260,277 A * 10/1941 Mercier ...................... 213/223
3,873,075 A * 3/1975 Pamer ......................... 267/116
3,947,061 A * 3/1976 Ellis ............................... 293/5
5,242,157 A * 9/1993 Bonenberger et al. ... 267/64.26
5,286,138 A * 2/1994 Goodwin ..................... 404/108
5,370,429 A * 12/1994 Reuber et al. ............... 293/119

* cited by examiner

Primary Examiner—Joseph D. Pape
Assistant Examiner—Greg Blankenship
(74) Attorney, Agent, or Firm—Rabin & Berdo, P.C.

(57) ABSTRACT

This invention is related to an energy dissipating device for an automobile bumper, which includes two or more energy dissipaters, one or more oil tanks and oil pipes. There is a hollow rod-piston in each energy dissipater, which divides the dissipater into two chambers: a front chamber and a back chamber. In each back chamber a hollow oil-pin is installed with damping holes (oil-holes) on it. Energy dissipaters are filled with oil, and the oil-tank is filled with air. This invention can stand heavy force. When automobiles suffer severe bumping, this device can effectively dissipate bumping energy and reduce the damage to vehicles and personnel to a minimum.

2 Claims, 1 Drawing Sheet

ENERGY DISSIPATING DEVICE FOR AN AUTOMOBILE BUMPER

BACKGROUND OF THE INVENTION

This application is related to an energy dissipating device for an automobile bumper.

When motor vehicles are running, accidents happen from time to time. It not only causes damage of vehicles, but also threatens the life and safety of vehicle riders. In order to reduce property damage and personal injury, motor vehicles are equipped with bumpers, bumping barriers or air bags, etc. But these devices work only under certain conditions. They cannot reduce the damage to the automobiles and riders to a minimum when automobiles suffer a severe shock. Therefore, people are eager to have an automobile safety device, which offers real safety to people and vehicles when vehicle accidents happen.

The purpose of this invention is to provide an energy dissipating device for an automobile bumper. When automobiles suffer severe shock, this device can convert the bumping kinetic energy from the bumper into thermal energy, which would then be dissipated, and therefore it can reduce vehicle damage and riders' injury to a minimum.

The goal of this invention is realized in the following technical ways:

This invention—the energy dissipating device for an automobile bumper—includes two or more energy dissipaters 3 & 11, one or more than one oil tanks 9 and oil pipes. There are hollow rod-pistons 2 & 10 in energy dissipaters 3 & 11, which divide the dissipaters into two chambers: front chamber 4 & 12 and back chamber 7 & 15. In each back chamber, hollow oil-pins 5 & 13 are installed with damping holes 6 & 14 on them. One end of the oil-pipe 8 is connected to oil pipe 19, the other end to oil-tank 9. For oil-pipe 19, one end is connected to back chamber 7 of dissipater 3, and the other end to back chamber 15 of dissipater 11. Energy dissipaters 3 & 11 are filled with oil, and oil-tank 9 is filled with air.

The advantage of this invention is that the larger a shock the automobile suffers, the more energy will be dissipated. When automobiles suffer strong bumps, the bumping energy can be dissipated rapidly, which buffers the automobiles effectively and reduces damage to vehicles and personnel to a minimum.

Further description is given below with the attached drawings and practical examples.

DETAILED DESCRIPTION OF THE INVENTION

Figure 1:
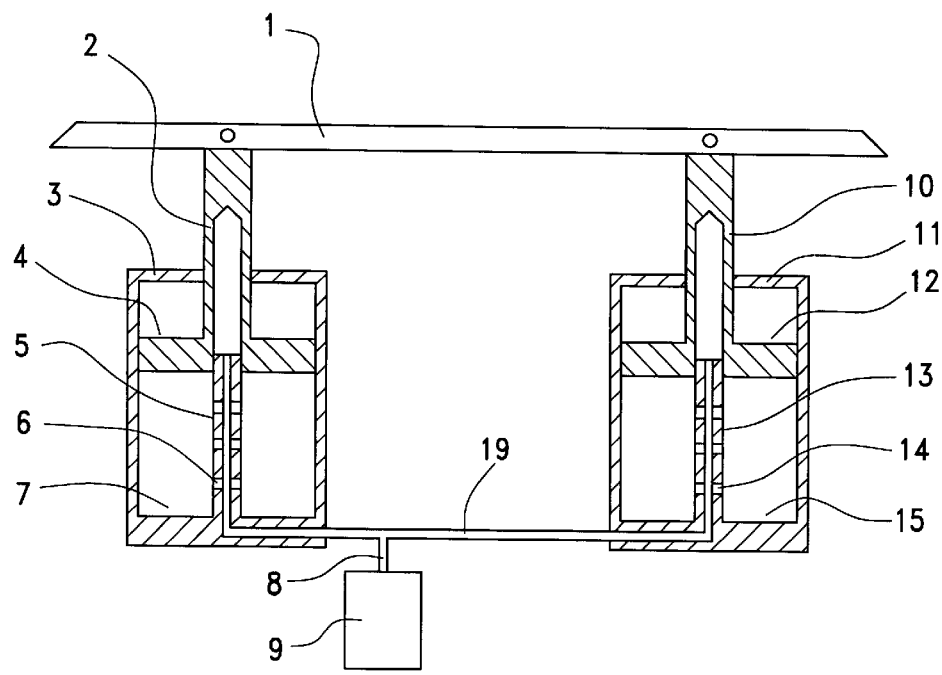
FIG. 1 is the structure schematic of a practical example 1 of this invention—the energy dissipating device for an automobile bumper.

FIG. 1 shows the practical example 1 for this invention. Two or more energy dissipaters 3 & 11 are installed on front bumper 1 of the automobile. Oil-tank 9 is also installed on it. The ends of hollow rod-pistons 2 & 10 of dissipaters 3 & 11 are connected to bumper 1.

Hollow rod-piston 2 divides the cavity of dissipater 3 into two chambers: front chamber 4 and back chamber 7. In the back chamber, hollow oil-pin 5 is installed with a few damping holes (oil holes) 6 on it. Hollow rod-piston 10 divides the cavity of dissipater 11 into two chambers: front chamber 12 and back chamber 15. In the back chamber, hollow oil-pin 13 is installed with a few damping holes (oil holes) 14 on it. One end of the oil-pipe 8 is connected to oil-tank 9, the other end is connected to back chamber 7 of dissipater 3, and connected to back chamber 15 of dissipater 11 through oil pipe 19. Energy dissipaters 3 & 11 are filled with oil, and oil-tank 9 is at least partially filled with air.

For practical use, the front end of this invention—the energy dissipating device for an automobile bumper is connected to the bumping barriers (bumper) 1, and the back end to the front fender of the vehicle or other proper parts. When the automobile suffers a strong bumping, the front bumper would pass the shock energy to hollow rod-pistons 2 & 10 of dissipaters 3 & 11. Hollow rod-pistons 2 & 10 would be pushed and moved backwards; therefore the oil in the cavity of the hollow rods would be forced to flow at high speed through damping-holes (oil-holes) 6 & 14 of hollow oil-pins 5 & 13, and finally enter oil-tank 9 through oil-pipes 8 & 19. Air in the tank is then compressed. In this way, the bumping energy is converted into thermal energy and dissipated. As a result, the automobile and personnel can be kept safe.

When the shock energy is dissipated, air in oil-tank 9 expands and forces the oil to enter back-chambers 7 & 15 of dissipaters 3 & 11, pushing hollow rod-pistons 2 & 10 to a reset position.

Figure 2:
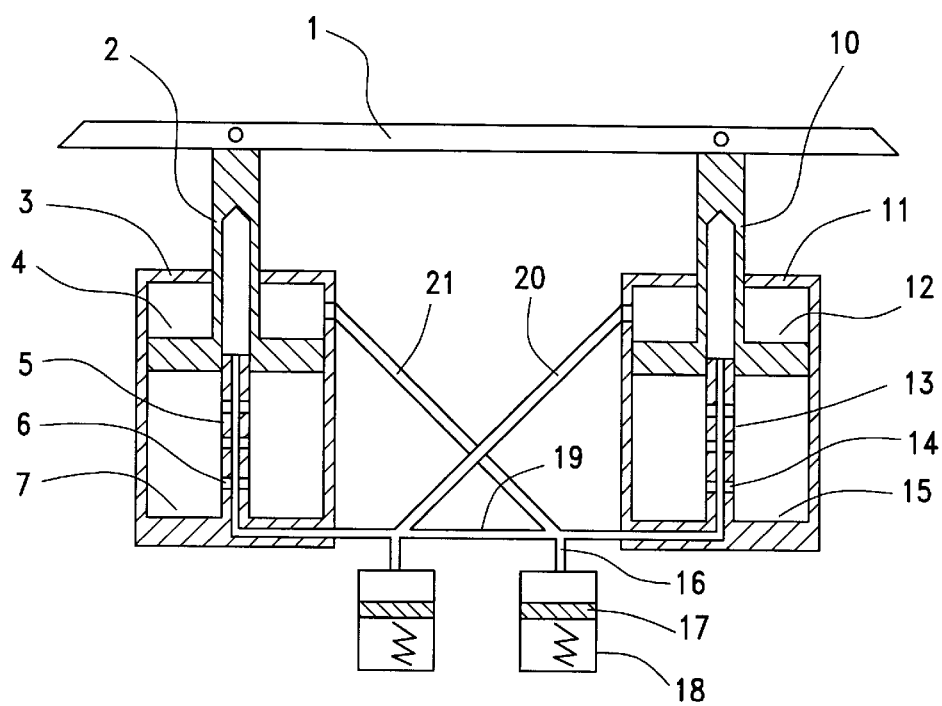
FIG. 2 is the structure schematic of practical example 2 of this invention—the energy dissipating device for an automobile bumper.

Oil pipes 20, 21 and 16, and oil-tank 18 can be also installed in this invention to coordinate the energy dissipaters. Refer to FIG. 2, it shows the second practical example of this invention. One end of oil-pipe 21 is connected to front chamber 4 of dissipater 3, the other end to back chamber 15 of dissipater 11 via oil-pipe 19. One end of oil-pipe 20 is connected to front chamber 12 of dissipater 11, the other end to back chamber 7 of dissipater 3 via oil-pipe 19. One end of oil-pipe 16 is connected to back chamber 15 of dissipater 11 via oil-pipe 19, the other end to oil tank 18.

Piston 17 is installed in oil tank 9 or 18, and there is air or a spring in the lower chamber of the oil tank.

When one side of an automobile receives a bump, the bumper would pass it to the hollow rod-piston of this side and make it move backwards. The oil in the chamber would be forced to go through the oil-pipe and enter the upper chamber of another dissipater, pushing another hollow rod-piston to move backwards. In this way, the coordination can be realized. The surplus oil would enter oil tank 9 & 18. After the shock energy is dissipated, the spring or air would push piston 17 and make hollow rod-pistons 2 & 10 reset.

According to the types of vehicles, the number of the energy dissipaters can be increased to enhance buffering effects.

The invention—the energy-dissipating device for an automobile bumper can be also Installed on the back of the vehicles to prevent tail bumping accidents.

What is claimed is:

1. An energy dissipating device for an automobile bumper, comprising:

at least a first and a second energy dissipater, each energy dissipater having a hollow rod-piston therein, and each energy dissipater being at least partially filled with oil, said hollow rod-piston dividing an interior space of said energy dissipater into a front chamber and a back chamber, each energy dissipater further having a hol low oil-pin disposed in the back chamber, said hollow oil-pin having a plurality of damping holes;

at least one oil tank at least partially filled with air; and a plurality of oil pipes, a first one of said oil pipes having one end connected to the back chamber of said first energy dissipater and having another end connected to the back chamber of said second energy dissipater, and a second one of said oil pipes having one end connected to said first one of said oil pipes and having another end connected to said oil tank.

2. The energy dissipating device described in claim 1, wherein said oil tank has a piston therein which divides said oil tank into an upper and lower chamber, the lower chamber having at least one of air and a spring therein.

* * * * *